March 13, 1945.  F. HOTCHNER  2,371,172
ILLUMINATED MOTION DISPLAY
Filed May 8, 1940   2 Sheets-Sheet 1
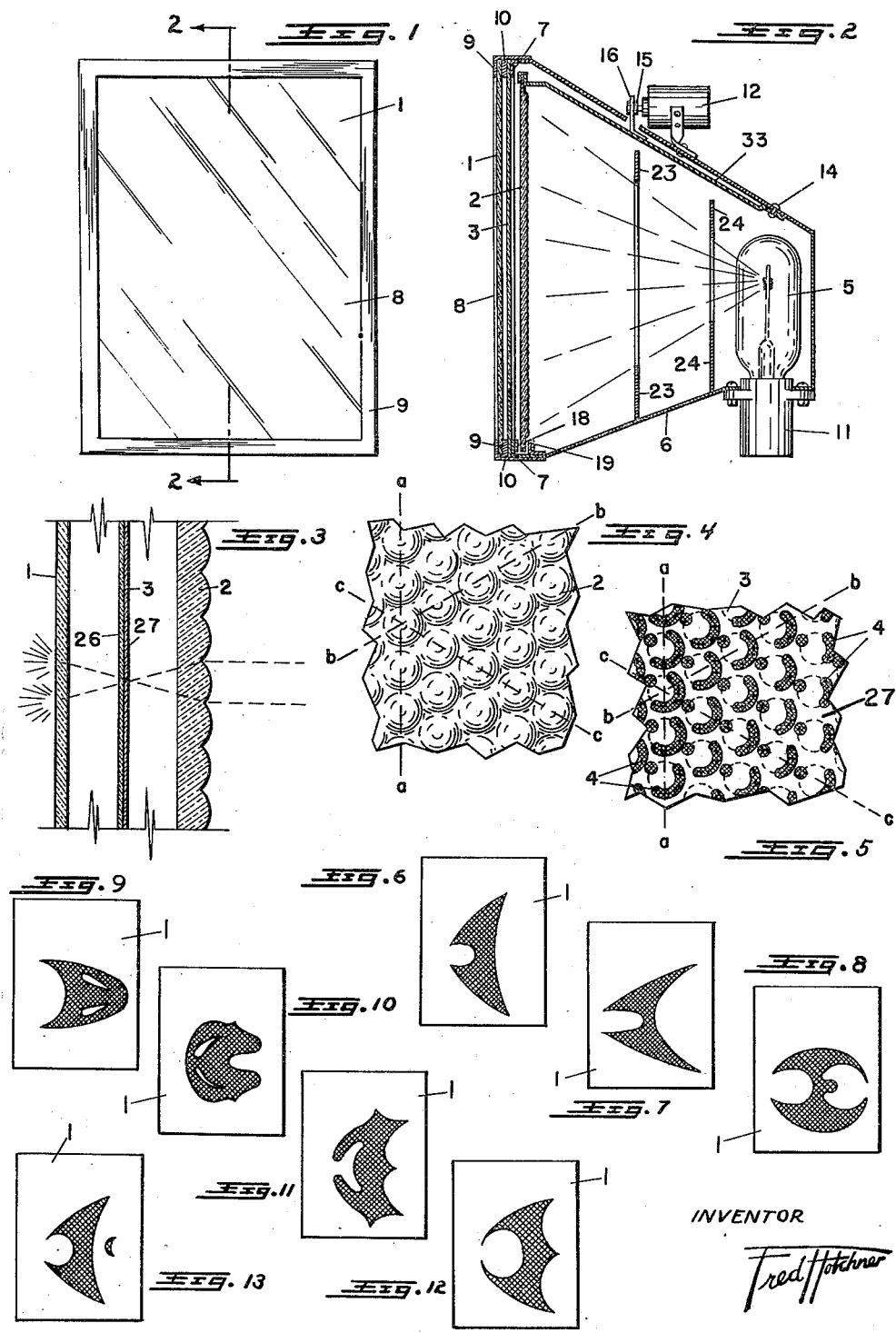
INVENTOR
Fred Hotchner

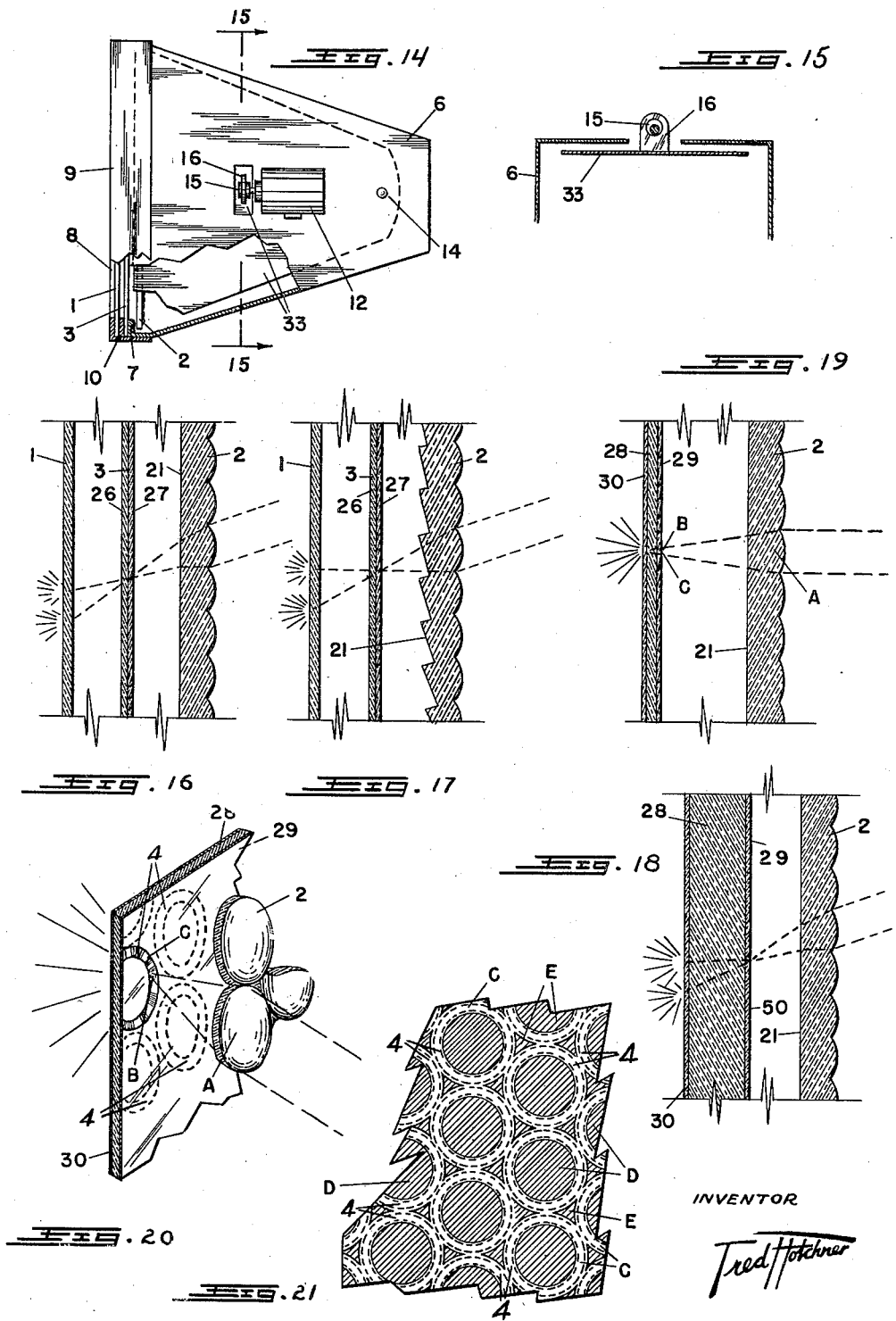

Patented Mar. 13, 1945

2,371,172

UNITED STATES PATENT OFFICE 2,371,172

ILLUMINATED MOTION DISPLAY

Fred Hotchner, Los Angeles, Calif.

Application May 8, 1940, Serial No. 333,993

15 Claims. (Cl. 40—132)

This invention provides for the display of pictorial or other ornamental or advertising effects brilliantly illuminated and in motion through continually repeated design sequences.

It has as its object to provide simple, low cost and reliable apparatus to display such animated matter with high tone contrast and fidelity to detail through continually repeated sequences in a smooth and natural manner, free from flicker and abrupt action changes, and visible over wide angles of view without optical aberration or overlapping of successive scenes to the instantaneous view.

Because of the very high level of illumination now current in stores and show windows, it is necessary that the display screen be brilliantly lighted in order that devices made hereaccording be effective in high circulation spots for advertising purposes. It is an object hereof to provide a device in which as powerful a light may be used as may be desired with ample provision for ventilation and no interference with the mechanism.

It is an object of the invention to make efficient use of the light falling on the lens screen. This may be accomplished to a high degree by ordinary construction methods, while as high a degree of refinement as may be desired for special purposes is within reach by appropriate attention to the fine detailing of the lenses and the use of special materials.

It is an object to produce highly attractive motion effects which seemingly change continually and do not create the impression of repetition through the repetitious exhibition of a limited number of scene changes. I have found that by producing a motion effect in which the focus of attention continually shifts from feature to feature throughout the cycle of changes, the impression of continual change is produced even though the cycle is traversed in a very short period of time. Particularly is this true as regards the general tendency of the effect to carry the eye across the field of view as in the waving of a flag. Thus the folding and swaying of the object may repeat a limited scene change in a fraction of a second without the observer being aware of the fact that he is observing the identical action over and over again. This effect enhances the perception of detail in accordance with natural laws of attention and thus increases the display value very materially over a still display or a moving display in which the focus of attention is fixed to a single detail.

It is among the objects hereof to produce very considerable apparent movement in the effect by very slight actual movement of the parts involved, whereby to simplify mechanical problems, as well as to provide relatively low cost and high mechanical reliability.

It is another object of the invention to produce effects on the display surface proper which are visible over wide angles of view without distortions which occur when the effects are viewed through refracting elements. According to the various embodiments of the invention shown the display surface is diffusive to light and hence it receives and displays the effects projected onto it from behind as though the scenes were actually on that surface.

A further object in a special form of the invention is to simplify the device by combining the pattern screen and the display screen in a single sheet unit.

It is a common shortcoming of display devices of the prior art which are internally illuminated that they are of little or no value by day light. It is an object of this invention to provide a display device having a display surface which may be devoted almost entirely to such painted or other permanent display for day showing as may be desired without suffering from the provisions for night illumination, and which will be fully as efficient for the purposes of animated illumination from within as though the display surface were wholly devoted to that service.

Various other objects of the invention will be apparent from the following specification taking into consideration that all equivalent structures are contemplated by the typical embodiments of the invention described therein and illustrated in the drawings.

The invention is shown in certain preferred embodiments in the accompanying drawings in which the same reference numeral appearing in several views is to be understood as indicating the same or the equivalent part throughout. The invention is not limited in form or in practice to the particular embodiments shown or methods of operation described but may be variously modified and practiced within the broad language of the claims.

Figure 1 is a front elevation of a device made hereaccording.

Figure 2 is a sectional view of the same taken as indicated by the section line 2—2 in Figure 1. In this form of the invention the beams projected onto the display surface from the rear have individually diverged after passing through the pattern screen so as to substantially cover this surface with light areas. It is distinguished from forms of the invention described below in which the beams individually converge to relatively small light spots at the display surface in order to leave most of the remainder of that surface available for a fixed display.

Figure 3 is an enlarged cross section of a portion of the assemblage of display, filter, and lens screens, with a typical light beam passing through these elements shown in broken lines. This section is taken near the center or optical axis of the device and the beam therefore is perpendicular to the screens.

Figure 4 is an enlarged rear elevation of a portion of the lens screen.

Figure 5 is an enlarged rear elevation of a portion of the pattern screen on the same scale as Figure 4 and showing the distribution of the patterns along lines parallel to three reference lines a—a, b—b and c—c similarly in position and distances to the distribution of the lenses in Figure 4. These views are taken near the optical axis of the device where the variation of pattern spacing due to the divergence of the beams from the optical axis is negligible.

Figures 6 to 13 are successive views of an animation sequence of fanciful nature, as it appears to view on the display surface, the action being continuous from Figure 13 to Figure 6 in repeated cycles through the series. The views are reduced in scale as compared to Figures 1 and 2.

Figure 14 is a plan view of the device with partial break-aways showing certain internal elements. Figure 15 shows a detail of the driving mechanism taken as indicated by the section line 15—15 in Figure 14.

Figure 16 is a section similar to that of Figure 3 of the screen assemblage taken at a distance from the optical axis of the device where the divergence of the beams is material. A typical beam through the elements is shown in broken lines, refraction at the front surface of the lens screen also being shown. Figure 17 is a cross section of a modification of the device in which the lens screen is designed to partially correct these conditions.

Figure 18 is a cross section of the screen assemblage of a modified form of the invention in which the pattern and display screens are integral in the form of a transparent sheet suitably finished on the opposing surfaces to perform both functions and of such thickness that the secondary beams diverge in passing through the sheet to such a degree as to involve the major portion of the display surface. Figure 5 illustrates a pattern arrangement on the rear surface of this sheet.

Figure 19 is a cross section of the screen assemblage of a further modification in which the pattern and display screens are integral in the form of a transparent sheet suitably finished on the opposing surfaces as the form of Figure 18. The screen unit thus formed is, however, relatively thin.

Figure 20 is a fragmentary perspective view taken from the rear as the screen assemblage shown in Figure 19 on a scale still further enlarged for the sake of clarity. In this view, as in Figure 19, a typical beam is shown in broken lines as it passes through the screen. The beam is taken near the optical axis of the device where the beams are perpendicular to the screens. In this form of the invention a minor portion of the display surface is involved in the animation effect, with the major portion of the surface used for any desired fixed scene visible by extraneous light.

Figure 21 is a front elevation of a portion of the exposed surface of the display screen at approximately the same scale as Figure 20, showing in broken lines the outlines of the pattern circuits on the rear of the sheet. The shaded areas show the portions of the front surface available for the fixed display. The general arrangement of patterns illustrated by Figure 5 is illustrative of the patterns of this form of the invention as well, as seen from the rear of the combination screen.

Figure 1 is a front elevation of a device made according to this invention having a display screen, preferably light diffusive, indicated by numeral 1, exposed to view with means provided to project from the rear a series of changing scenes which are continually repeated in a given sequence. Each scene is produced by a great number of spots of light varying in tone or color according to the showing. Each spot of light is produced by an individual beam of light which has been projected from a lens screen 2, through a pattern screen 3. For each beam the pattern screen bears a circuitous pattern, such as indicated by 4, 4, etc., in Figure 5, the light ray permeability of which varies from point to point around the circuit according to the changing light value for the corresponding light spot on the display screen from scene to scene throughout the sequence of the effect. Each beam intersects at each stage of the action one small section of its corresponding pattern and is modulated thereby in accordance with the pattern permeability.

A light source, such as the concentrated filament lamp 5, furnishes the illumination. In the device shown in these views, the rays of the primary beam diverge from the lamp filament to the lens screen. Thus the light spots finally produced on the display screen 1 will spread somewhat toward the edges of the display. This condition may be reduced by refracting formations on one surface of the lens screen such as shown in Figure 17. By the use of condensing lenses or reflectors, parallel light may be thrown onto the lens screen if desired for more refined construction. The individual lenses of the lens screen project a plurality of separate secondary beams toward the pattern screen, preferably individually convergent with the minimum cross section at the plane of the pattern screen. The patterns are all similar in outline and size and so distributed over the pattern screen with respect to the beam intersections that, for each position assumed by the lens screen with respect to the pattern screen, each beam intersects its corresponding pattern at about the same circuit position for all of the beams, which relative positioning is maintained throughout the action. Thus, at each stage of the operation the beams transilluminate and are modulated by a group of pattern sections different than those transilluminated in the other stages of the operation. The permeability of the patterns is therefore so arranged that each group of pattern sections so involved will modulate the beams in accordance with the light values required on the display screen from area to area to represent an image in the animation effect.

Either the pattern screen or the lens screen may be moved with relation to the other to traverse these beams around the corresponding patterns. The lenses and patterns are shown much exaggerated in size for purposes of illustration. Actually they are so closely spaced over the screen surfaces that it is of little moment that the lens screen is moved with the pattern screen stationary, with the resulting exhibited scenes shifting slightly to view. This being one practical mode of construction I have shown this arrangement in the sectional view of Figure 2, reference being had now to Figures 14 and 15 also.

The general assemblage is based on the box 6 which has an inturned flange 7 around the front opening 8. This flange cooperates with the frame 9 to form a secure seating for the display screen and the pattern screen; the spacer 10 between the screens providing accurate positioning. The receptacle 11 passing through the bottom of the box serves as a back leg. The usual service wires, not shown, provide current for the lamp. The motor 12 is mounted to the top of the box and is served by a pair of wires not shown.

The lens screen is shifted in a gyratory manner along a circular path of approximately the same diameter as that of the patterns on the screen as shown by the broken lines in Figure 5. The movement being very slight the geometric inaccuracies of the drive shown may be neglected and the movement considered for all intents and purposes hereof as a parallel movement of the screen 2 in its plane. The motor, which turns at the same number of revolutions per minute as the number of complete cycles of change in the action, drives the plate 16 by means of the eccentric hub 15. This plate extends through an opening in the top of the box and is connected tight to the plate 33 which in turn is tight to the top edge of the lens screen 2. The rear end of the plate 33 is held by the loose rivet 14 snug to the top of the box, free to turn and swing up and down but retained in a parallel position with regards to a horizontal line through the rivet from one side to the other of the box. The bottom of the screen slides between the backturned edge 18 of the flange 7 and the spacer angle 19. The screen is thus moved up and down and from side to side so that each point on it follows a closed circuit.

In Figure 3 the projected beam, shown by broken lines, converges from the lens screen to the pattern screen and diverges to the display screen to such a degree that the display screen is practically completely covered with such beams. Substantially the whole of the display screen is thereby illuminated, each section to that intensity, relative to the others, required to produce the image in the animation effect for each instant of view. The bundle of rays in the primary beam from which this projected beam is derived is similarly indicated by broken lines to the right of the lens screen. If the number of beams per square inch be high enough that the eye will integrate a number of small brilliant spots of light into a uniform field, this condition may be eliminated as a necessary feature of design and the pattern and display screens spaced from each other such a distance that the light does not diverge sufficient to cover the surface of the display screen.

With such construction, from the normal distance of view, the effect is practically the same due to the fact that the bright spots tend to merge together to view. However, on close inspection the display screen appears to be covered with small bright spots separated by dark spaces from each other. This latitude in design is taken advantage of to accomplish other desirable objects described below.

It is an important object of the invention to provide a device which may be constructed with the minimum of necessity for accuracy. Considering now Figure 16 which shows the condition of a typical beam at an edge of the device distant from the primary beam axis. Because of the deviation of the primary beam and the refraction of the secondary beam at the lens screen the secondary beams reach the display screen at increasingly acute angles the farther from the primary beam axis. The intersection of the individual beams with the display screen becomes a conic section and the distance from the pattern screen has increased so that the beams may overlap. Several obvious corrections may be made. The simplest correction, and one entirely adequate for most purposes, is to move the display screen closer to the pattern screen and allow the eye to integrate the scenes from light spots which will vary in size across the pictures. In the modification shown in Figure 17 the surface 21 is formed with prisms to partially correct this condition.

A certain amount of spectral dispersion will be present. Here again, if the number of spots per unit area is sufficiently high, the eye may be safely depended upon to integrate the colors and observe the intended effect, as there is no detail in the individual beams at any instant of the action.

Thus with the mechanism shown, the very slight movement required permits of neglecting the geometric deviation from true parallel movement of the lens screen. And the various latitudes permissible in the design of the screens permits of such low cost construction as to bring these devices within the reach of advertisers and others for uses which exclude, on the basis of cost, more elaborate apparatus.

Preferably the display screen is of light diffusive material or has a light diffusing surface in order that the effects may be observed from any normal angle of view. Opal glass, cased glass and glass with an etched surface are suitable for this purpose.

The box is provided with the usual ventilation and the inside surfaces finished dark to prevent false images. In Figure 2 diaphragms 23 and 24 are shown with apertures just sufficient to pass the primary beam. These diaphragms are also finished dark. In some instances the light used may be so intense that the heating of the screens becomes important and should be limited. This factor will now be considered in connection with the description of the pattern screen.

A rear elevation of a small portion of the lens screen is shown in Figure 4. In practice the lenses may be as small as one-eighth of an inch without involving any considerable difficulty in manufacture. Either pressed glass or moulded plastic material is suitable for this purpose. Spherical surfaces are sufficiently true optically to be satisfactory for this design. The screen may be constructed of a plurality of individual lenses mounted in any appropriate manner, the term "lens screen" embracing all equivalent structures. The lenses are nested along three axes $a$—$a$, $b$—$b$ and $c$—$c$ 120° apart, as shown in Figure 4.

The corresponding portion of the pattern screen, taken near the center or optical axis of the device, is shown in Figure 5, one pattern corresponding to each lens with regards to the axis of each projected, or secondary, beam. That is, each beam intersects its corresponding pattern at about the same circuit position thereon and maintains this relative positioning throughout the operation of the device as the beams are traversed around the patterns. The portion of the pattern screen here shown is positioned near the axis of the primary beam, and hence the patterns will be found substantially arranged in the same manner as the lenses of Figure 4. At increasing distances from the center the spacing of the patterns will increase slightly radially from the center but they will maintain the same general arrangement, size and form. In order to simplify the explanation a layout of dark and light areas to produce a very simplified action is shown by the patterns. Each of the patterns shown is represented by a dark arched portion and a dark round portion. Through these dark portions runs a dotted circle. This circular line represents the course followed by the central ray of the individual secondary beam which traverses the pattern. The dark arched and round portions represent the parts of the pattern which are coated with opaque or filtering paint, printing, photographic finish, or the like to block or filter the light as the beam passes over them. The screen is transparent except where the dark areas are shown. The cut-off from dark to light beam is abrupt. Obviously the permeability to light may vary gradually and various colors produced by appropriate screen design. This view is illustrative of the patterns of the other forms of the inventions shown as found near the optical axis of the device.

Starting now from the top and traversing the beams simultaneously clockwise around the patterns, a dark shadow will sweep across the corresponding portion of the display screen. If we take Figures 4 and 5 as looking at the rear surfaces of the two screens, then when facing the display this shadow will be seen to move from upper right to lower left in the time it takes the beams to move from 20° to 60° as we consider Figure 5. This shadow will disappear from left to right from 130° to 180°. At 320° a momentary darkening will occur over the entire area shown.

A suitable method of constructing the pattern screen is by photographic projection in technical reverse of the normal functioning of the device. The patterns may also be lithographed onto the screen. For devices in which the intensity of the light is very high, the patterns may be formed as mirrors or transparent mirrors so that the light intercepted is thrown back into the box to protect the screen from excessive heat. Since the rays are divergent from the source they will in most cases of such reflection strike one of the darkened interior surfaces direct as they will be reflected away from the primary beam axis through the lens screen into the box and there absorbed.

In Figures 6 to 13 I show an animation effect produced on the display screen 1 to view by light condensed into secondary beams by the lens screen 2, projected through the pattern screen 3 and received by the display screen to transilluminate the same and produce the images. The light portions of these views represent those portions of the display screen which are reached by beams which have passed through the pattern screen without being obstructed, and the dark portions those which have been cut off from the beams by dark portions of the respective patterns on the pattern screen.

The action sequence shown in Figures 6 to 13 is continuous in the sense that the showing of Figure 13 continues with that of Figure 6 so that there is no pause in the action. This sequence is a simplified representation of the action. In practice there would be numerous intermediate scenes and the change from one showing to the next is made gradually and very much slower than would be the case with pictures projected through a shutter from motion picture film. Thus by contriving the design that the end of the action will in form and movement flow into the beginning, the observer will be given the impression that the action is continuous and the repetitious effect largely masked. I have found, for instance, as a specific case in the application of this principle, that a flame effect repeating its cycle of changes four times a second appears as continually changing with no repetition. The amount of detail and the length of the cycle of changes is naturally a matter of refinement of the device. In general, for most purposes of ornamental or advertising display sufficient changes and detailing of the scenes may be had with ordinary methods of construction. The devices may also be constructed with intermittent drive mechanisms so that one showing at a time is displayed instead of animation effects.

The pattern screen shown in Figures 3, 5, 16 and 17 consists of a sheet member 26 of light permeable material, such as glass or plastic sheeting, with a coating 27 of whatever material be used to represent the patterns, such as photographic emulsion or layer of pigmented varnish. The coating 27 is shown of uniform thickness, as preferably the patterns are formed by photographically impressing and developing variable permeability areas in such a coating in the form of the desired patterns. Proportionate thickness of the layers has not been observed, as the layer 27 is shown much exaggerated in thickness for the sake of illustration. The display screen is shown as a single layer sheet which is representative in this case of material light diffusive throughout, such as opal glass.

In Figure 18 I show a combination in which the pattern screen is combined with the display screen. A plate of glass or other transparent material 28 is coated on the inside surface with a layer of material 29 representative of the patterns, and on the outside surface with a layer of light diffusive material 30. The outside surface may be frosted as an alternative procedure or any other equivalent light diffusive detail used. The plate is of such thickness that the projected beams diverge through it to occupy the major portion of the exposed surface. It is noted that this plate also serves to bend the beams by refraction at the surface 50 toward the perpendicular, thus compensating in a measure for the divergence of the primary beam. A beam is traced through the elements by broken lines to illustrate this principle.

In Figure 19 I show a cross section of the screen assemblage of a further modification of the invention in which the pattern and display screens are formed integral in a sheet of comparatively thin section. The beams do not diverge after passing through the patterns to cover large spots on the display screen, but come to focus at or near the display screen surface. Thus as shown in the fragmentary perspective view of Figure 20, the light from a lens A converges to a point B of the corresponding pattern C shown in full lines, passes through the plate and is diffused as a bright spot on the display surface which is light diffusive over the areas corresponding to the patterns C. The boundary of a ray bundle to the individual lens under consideration is shown by broken lines and the converging beam to the individual pattern under consideration in the same manner. The rays diffused from the spot are similarly indicated in radiating lines, this view corresponding to a similar representation in Figure 19. This scheme is typical of the other elements of the system, certain other of the patterns being shown by broken lines.

Figure 21 is a front view of a portion of the display screen showing the areas involved in the animation effect here also indicated by C. It is thus seen that the major portion of the display surface, indicated by the circular areas D is available for a painted display for day showing. The broken lines here indicate the pattern proper, a marginal space being left within and without each pattern to allow for some diffusion in passing through the transparent sheet and also to compensate for inaccuracies in the optical alignment of the elements of the device. The small areas E may also be devoted to the fixed scene. The areas D and E preferably are opaque and are shown in the view shaded. The fixed scene represented on the areas D and E is independent of the animation effect produced through the areas C, neither effect interfering with the other in any respect.

When the display is viewed in the dark the projected scenes will be thus represented by a number of brilliant spots of light distributed over the display surface. Due to the phenomenon of halation each spot will appear to involve the display surface around it, so that if the spot density per square foot is high enough the surface will appear to be illuminated as though it were entirely transparent and lighted from behind to an intensity which is the average for each region over the display surface of transmitted light.

Either screen may be moved with respect to the other, although in general it is more practicable to shift the lens screen. The animated scene will thus gyrate over the display surface by the amount of the displacement of the spots as they travel around the patterns. Generally this may be neglected because of the small pattern diameters which will usually be used.

The various details of the different forms of the invention are to be understood as applicable, when so suited, to all the other forms as alternative details.

As used in the claims the following terms are to be understood as having the significance which follows: The terms of the claims are to be broadly construed as embracing all substantial equivalents thereof.

The terms "similar," "similarly located" and "similarly formed" are to be construed broadly as embracing all such variations as do not depart from the essential features of the invention.

The term "circuitous" as used with reference to the form of the patterns is to be understood as distinguishing the pattern from such forms as involve an abrupt change of position from the end of one cycle to the beginning of the next.

The term "scene" is used in the generic sense as embracing any design, picture, symbol, inscription, character, etc., or any combination of any of such.

The term "fixed scene" embraces any surface finish visible by extraneous light on the main display surface.

The term "variable permeability" embraces variations in light transmission in tone and in color and all other variations of the transmitted light.

The term "light aperture" embraces both spaces through the screens of devices made hereaccording from which the material of the screen has been removed, and light permeable regions through the substance of the screen or assemblage of elements so functioning.

The term "beam" is to be understood as describing a bundle of light rays to which other rays may be added or subtracted during the operation of the device, and not to a grouping of specific rays. That is to say, as the lens screen moves respective to the light source, each projected beam is being continually reformed by new ray groupings within the sense of my term.

Likewise the term "traverse the beams," and the like, describes the operation in effect of traversing the beams to move them along the respective patterns, both in the instance in which beams of unchanging ray groupings are involved and the instance in which the beams are being continually reformed by new ray groupings. The traverse may be effected either by moving the screen with its patterns through stationary beams so as to move each pattern through its respective beam, or by causing the beams to move along the patterns of a stationary screen.

Having thus described my invention, what I claim is:

1. An exhibition device including a pattern screen bearing a plurality of similarly formed, variable permeability, circuitous filter patterns, means to project a separate beam of light upon a similarly located portion of each of said patterns, means to traverse all of the beams so projected simultaneously around the circuits of said patterns, and a screen positioned to receive said beams and exhibit the resulting images.

2. An exhibition device including a filter screen bearing a plurality of similarly formed, variable permeability, circuitous pattern patterns, means to project a separate beam of light through a similarly located portion of each of said patterns, means to traverse all of the beams so modified simultaneously around the circuits of said patterns, and a light diffusing screen positioned to be transilluminated by the beams so modified and exhibit the resulting images.

3. An exhibition device including a filter screen bearing a plurality of similarly formed, variable permeability, circuitous pattern patterns, a light source and means to project therefrom a separate beam converging to a similarly located portion of each of said patterns to transilluminate a small section thereof at a narrow section of the beam, means to traverse said beams simultaneously around the circuits of said patterns, and a light diffusing screen positioned to be transilluminated by and to diffuse the beams so modified at a wider part of each thereof to form composite images substantially filling the field to view.

4. An exhibition device including a filter screen bearing a plurality of similarly formed, variable permeability, circuitous pattern patterns, a light source and lenticular means to project a separate beam therefrom through a similarly located portion of each of said patterns, means to traverse said beams simultaneously around the circuits of said patterns, and a light diffusive screen positioned to be transilluminated by the beams so modified and exhibit the resulting images.

5. An exhibition device for producing animation effects including a pattern screen bearing a plurality of variable permeability light filter patterns each following the course of a closed circuit of general outline common to all and distributed over the image bearing area of said pattern screen, means to project a plurality of beams of light in one general direction through said pattern screen, a separate one of which beams intersects to transilluminate a small section of each of said patterns in the same general circuit position thereof, means to simultaneously traverse all of said beams around the circuits of their respective patterns while maintaining the relative positioning stated to transilluminate successive small sections of said patterns in continually repeated cycles of operation, a display screen positioned to receive said beams after passing through the patterns of said pattern screen and exhibit the resulting effects, the permeability to light of said patterns varying from section to section around the circuits thereof and with respect to each other in proper manner to produce in each stage of the operation above stated a distinct image on said display screen by virtue of the modulation of each of said beams by the pattern section through which it passes to the proper light value for that image and that instant of the portion of said display screen reached by each of said beams, each image so produced being serially related to all the other images so produced in a sequence of image changes of an animation effect continually repeated by the cyclic traversing of said patterns by said beams.

6. An exhibition device for producing animation effects including a pattern screen bearing a plurality of variable permeability light filter patterns each following the course of a closed circuit of general outline common to all and distributed over the image bearing area of said pattern screen, means to project a plurality of beams of light in one general direction through said pattern screen, a separate one of which beams intersects to transilluminate a small section of each of said patterns in the same general circuit position thereof, means to simultaneously traverse all of said beams around the circuits of their respective patterns while maintaining the relative positioning stated to transilluminate successive small section of the pattern of said pattern screen in continually repeated cycles of operation, a light permeable and diffusive display screen positioned to be transilluminated by said beams after the same pass through said pattern screen and exhibit the resulting effects to view from the opposite side, the permeability to light of said patterns varying from section to section around the circuits thereof and with respect to each other in proper manner to produce in each stage of the operation above stated a distinct image on said display screen by virtue of the modulation of each of said beams by the pattern section through which it passes to the proper light value for that image and that instant of the portion of said display screen reached by each of said beams, each image so produced being serially related to all the other images so produced in a sequence of image changes of an animation effect continually repeated by the cyclic traversing of said patterns by said beams.

7. An exhibition device for producing animation effects including a pattern screen bearing a plurality of variable permeability light filter patterns each following the course of a closed circuit of general outline common to all and distributed over the image bearing area of said pattern screen, means to project a plurality of beams of light in one general direction through said pattern screen, each of said beams converging to and transilluminating a small section of one of said patterns at a narrow part of the beam and in the same general circuit position on the pattern, means to simultaneously traverse all of said beams around the circuits of their respective patterns while maintaining the relative positioning stated to transilluminate successive small sections of the patterns of said pattern screen in continually repeated cycles of operation, said beams diverging after passing through said patterns, a display screen permeable and diffusive to light positioned to receive said beams after they have diverged to such a degree as to substantially cover the same and exhibit the resulting effects, the permeability to light of the patterns of said pattern screen varying from section to section around the circuits thereof and with respect to each other in proper manner to produce in each stage of the operation above described a distinct image on said display screen by virtue of the modulation of each of said beams by the pattern section through which it passes to the proper light value for that image and that instant of the portion of said display screen reached by each of said beams, each image so produced being serially related to all the other images so produced in a sequence of image changes of an animation effect continually repeated by the cyclic traversing of said patterns by said beams.

8. An exhibition device for producing animation effects including a pattern screen bearing a plurality of variable permeability light filter patterns each following the course of a closed circuit of general outline common to all and distributed over the pattern bearing area of said pattern screen, means to project a plurality of beams of light in the same general direction through said pattern screen, a separate one of which beams intersects to transilluminate at one time a small section of each of said patterns in the same general circuit position thereof, means to simultaneously traverse all of said beams around the circuits of their respective patterns while maintaining the relative positioning stated to transilluminate successive small sections of said patterns in continually repeated cycles of operation, a light diffusive member positioned so as to receive and diffuse the light of the beams so modulated to render the resulting effects visible over wide angles of view, the permeability to light of said patterns varying from section to section around the circuits thereof and with respect to each other in proper manner to produce in each stage of the operation above stated a distinct image to view by virtue of the modulation of each of said beams by the pattern section through which it then passes to the proper light value for the portion of the image thereby represented.

9. An exhibition device for producing animation effects including a pattern screen bearing a plurality of variable permeability light filter patterns each following the course of a closed circuit of general outline common to all and distributed over the pattern bearing area of said pattern screen, means to project a plurality of convergent beams of light in the same general direction through said pattern screen, a separate one of which beams intersects to transilluminate at one time a small section of each of said patterns in the same general circuit position thereof, said intersections taking place at narrow sections of said beams, means to simultaneously traverse all of said beams around the circuits of their respective patterns while maintaining the relative positioning stated to transilluminate successive small sections of said patterns in continually repeated cycles of operation, a light diffusive member positioned so as to receive and diffuse the light of the beams so modulated to render the resulting effects visible over wide angles of view, the permeability to light of said patterns varying from section to section around the circuits thereof and with respect to each other in proper manner to produce in each stage of the operation above stated a distinct image to view by virtue of the modulation of each of said beams by the pattern section through which it then passes to the proper light value for the portion of the image thereby represented, each image so produced being serially related to all the other images so produced in a sequence of image changes of an animation effect continually repeated by the cyclic traversing of said patterns by said beams.

10. A display device provided with a display screen having a plurality of light apertures distributed over a region at which the effect of animation is to be produced, a light source, means optically positioned between said elements to condense light rays into a plurality of separate beams convergent each toward one of said apertures, and a pattern screen intersecting at least certain of said beams and bearing a plurality of variable permeability patterns adapted to independently modulate the same and thereby vary the comparative light values of the beams at said apertures to produce a distinct optical effect thereby in representation of a design as viewed from the opposite side of said display screen.

11. A display device provided with a display screen having a plurality of light apertures distributed over a region at which the effect of animation is to be produced, a light source, means optically positioned between said elements to condense light rays into a plurality of separate beams convergent each toward one of said apertures, a pattern screen bearing a plurality of variable permeability patterns corresponding one each to at least certain of said beams and formed to be transilluminated by the same in one small pattern section for each stage of the operation of said device, and means to cause the beams so intersected to shift stage by stage and simultaneously each along the course of its respective pattern to transilluminate successive small sections thereof, each of said patterns being adapted to independently modulate its respective beam so as to produce, in each stage of the operation of said device, a distinct image to view from the opposite side of said display screen, and successive different images from stage to stage serially related in an animation effect.

12. A display device provided with a screen having a plurality of light apertures distributed over a region at which the effect of animation is to be produced, means to project a separate light beam toward each of said apertures, and means to vary the comparative light values of said beams from time to time in a repeated time cycle of changes in such order that at each stage of said operation the light thus transmitted through said screen is completely representative of a distinct image serially related to other such images in each other stage of said operation in an animation effect.

13. A display device provided with a display screen having a plurality of light apertures distributed over a region at which the effect of animation is to be produced, means to project a separate light beam toward each of said apertures, means to vary the comparative light values of said beams comprising a pattern screen bearing a plurality of circuitous, variable permeability patterns corresponding each to one of said beams and intersecting said beams in one small pattern section at a time to present to view by the light thus projected and modified a distinct image for each position of said pattern screen with respect to said beams, and means to shift said pattern screen in such manner as to simultaneously traverse said patterns with said beams stage by stage to transilluminate in each stage the pattern sections representative of one image at a time to present to view a series of such images in an animation effect.

14. A display device provided with a display screen having a plurality of light apertures distributed over a region at which the effect of animation is to be produced, means to project a convergent beam of light to each of said apertures, filter means intersecting said beams and bearing a plurality of circuitous filter patterns each corresponding to one of said beams, said patterns varying in permeability to light over their respective areas and relative to each other in such order that each image of a series of composite images is represented at one time in the aggregate by the light transmitted through one small section of each of said patterns, each of which pattern sections is serially related around the respective pattern circuits to other pattern sections representative in similar aggregations of other and serially related images, said beams intersecting at one time pattern sections representative of one such image, and means to traverse said filter means relative to said beams to simultaneously in effect traverse all of said beams around the circuits of the respective patterns to transilluminate stage by stage the pattern sections representative of one image after another in a sequence of an animation effect.

15. A display device provided with a display screen having a plurality of light apertures distributed over a region at which the effect of animation is to be produced, means to project a convergent beam of light to each of said apertures, filter means intersecting said beams and bearing a plurality of circuitous filter patterns each corresponding to one of said beams, said patterns varying in permeability to light over their respective areas and relative to each other in such order that each image of a series of composite images is represented at one time in the aggregate by the light transmitted through one small section of each of said patterns, each of which pattern sections is serially related around the respective pattern circuits to other pattern sections representative in similar aggregations of other and serially related images, said beams intersecting at one time pattern sections representative of one such image, means to traverse said filter means relative to said beams to simultaneously in effect traverse all of said beams around the circuits of the respective patterns to transilluminate stage by stage the pattern sections representative of one image after another in a sequence of an animation effect, and means to diffuse the light passing through said apertures to render the resulting composite images visible over relatively wide angles of view.

FRED HOTCHNER.